(12) United States Patent
Chupa et al.

(10) Patent No.: US 8,344,531 B2
(45) Date of Patent: Jan. 1, 2013

(54) ENERGY GENERATING ASSEMBLY AND A METHOD FOR GENERATING ENERGY

(76) Inventors: John Gerard Chupa, Farmington Hills, MI (US); Subramaniam Ganesan, Rochester Hills, MI (US)

(*) Notice: Subject to any disclaimer, the term of this patent is extended or adjusted under 35 U.S.C. 154(b) by 516 days.

(21) Appl. No.: 12/592,914

(22) Filed: Dec. 4, 2009

(65) Prior Publication Data

US 2011/0133452 A1      Jun. 9, 2011

(51) Int. Cl.
*F03B 13/00* (2006.01)
(52) U.S. Cl. .................... 290/43; 290/54; 60/496
(58) Field of Classification Search .............. None
See application file for complete search history.

(56) References Cited

U.S. PATENT DOCUMENTS

| | | | |
|---|---|---|---|
| 2,436,683 A * | 2/1948 | Wood, Jr. .............. | 290/52 |
| 2,579,932 A | 12/1951 | Kobernick | |
| 3,589,313 A | 6/1971 | Smith et al. | |
| 3,601,979 A * | 8/1971 | Singer ................. | 60/326 |
| 3,670,669 A | 6/1972 | Hoad | |
| 3,741,890 A | 6/1973 | Smith et al. | |
| 3,750,001 A * | 7/1973 | McCloskey ........... | 322/35 |
| 3,827,946 A | 8/1974 | Grimett et al. | |
| 4,010,098 A | 3/1977 | Fassell | |
| 4,052,858 A * | 10/1977 | Jeppson .............. | 60/648 |
| 4,157,961 A | 6/1979 | Borst | |
| 4,196,590 A * | 4/1980 | Fries ................. | 60/496 |
| 4,246,753 A * | 1/1981 | Redmond ............. | 60/398 |
| 4,290,269 A | 9/1981 | Hedstrom et al. | |
| 4,291,636 A | 9/1981 | Bergsten et al. | |
| 4,316,774 A | 2/1982 | Trusch | |
| 4,321,151 A | 3/1982 | McMullen | |
| 4,408,127 A * | 10/1983 | Santos, Sr. ........... | 290/54 |
| 4,454,427 A | 6/1984 | Sosnowski et al. | |
| 4,624,417 A | 11/1986 | Gangi | |
| 4,657,681 A | 4/1987 | Hughes et al. | |
| 4,703,621 A * | 11/1987 | Barrett .............. | 60/496 |
| 4,731,545 A * | 3/1988 | Lerner et al. ......... | 290/54 |
| 4,733,528 A | 3/1988 | Pinto | |
| 4,750,454 A | 6/1988 | Santina et al. | |
| 4,762,527 A | 8/1988 | Beshore et al. | |
| 4,769,149 A | 9/1988 | Nobilet et al. | |
| 4,784,770 A | 11/1988 | Nagao | |
| 4,818,405 A | 4/1989 | Vroom et al. | |
| 4,880,533 A | 11/1989 | Hondulas | |
| 5,024,770 A | 6/1991 | Boyd et al. | |
| 5,032,289 A | 7/1991 | Martineau | |
| 5,279,637 A | 1/1994 | Lynam et al. | |
| 5,428,906 A | 7/1995 | Lynam et al. | |
| 5,445,088 A | 8/1995 | Daugherty et al. | |
| 5,451,137 A | 9/1995 | Gorlov | |

(Continued)

OTHER PUBLICATIONS

Cogeneration of the Robert O. Pickard Envirnmental Centre Jun. 10, 2008.

(Continued)

*Primary Examiner* — Michael Zarroli
(74) *Attorney, Agent, or Firm* — John Chupa

(57) ABSTRACT

A number of electrical energy generating assemblies, such as assemblies 10, 240, and 400 which are disposed within a pipeline 12 or in close proximity to the inlet 11 and/or outlet portion 125 of the pipeline 12 and which are adapted to selectively generate electrical energy by use of the material 18 which normally flows through the pipeline 12 according to a certain process.

4 Claims, 5 Drawing Sheets

U.S. PATENT DOCUMENTS

| | | | |
|---|---|---|---|
| 5,500,306 A | 3/1996 | Hsu et al. | |
| 5,534,659 A | 7/1996 | Springer et al. | |
| 5,556,232 A | 9/1996 | Malmgren | |
| 5,642,984 A | 7/1997 | Gorlov | |
| 6,036,443 A | 3/2000 | Gorlov | |
| 6,155,892 A | 12/2000 | Gorlov | |
| 6,216,463 B1 | 4/2001 | Stewart | |
| 6,253,700 B1 | 7/2001 | Gorlov | |
| 6,269,638 B1 * | 8/2001 | Murata | 60/496 |
| 6,293,835 B2 | 9/2001 | Gorlov | |
| 6,299,774 B1 | 10/2001 | Ainsworth et al. | |
| 6,387,281 B2 | 5/2002 | Millard et al. | |
| 6,798,080 B1 * | 9/2004 | Baarman et al. | 290/43 |
| 7,216,483 B2 * | 5/2007 | Takeuchi | 60/495 |
| 7,357,599 B2 * | 4/2008 | Cripps | 405/75 |
| 7,501,712 B2 * | 3/2009 | Bolyard | 290/43 |
| 7,579,703 B2 * | 8/2009 | Shifrin | 290/52 |
| 7,768,146 B2 * | 8/2010 | Balzano | 290/54 |
| 7,915,749 B1 | 3/2011 | Chupa et al. | |
| 7,959,411 B2 * | 6/2011 | Schlabach et al. | 416/227 A |
| 8,092,675 B2 * | 1/2012 | Kennedy | 210/167.11 |
| 8,154,138 B2 | 4/2012 | Ganesan et al. | |
| 2005/0248161 A1 * | 11/2005 | Heidel | 290/54 |
| 2010/0327590 A1 * | 12/2010 | Lee et al. | 290/52 |

OTHER PUBLICATIONS

Sanitary sewer—published by Wikipedia downloaded on Jun. 21, 2010.

\* cited by examiner

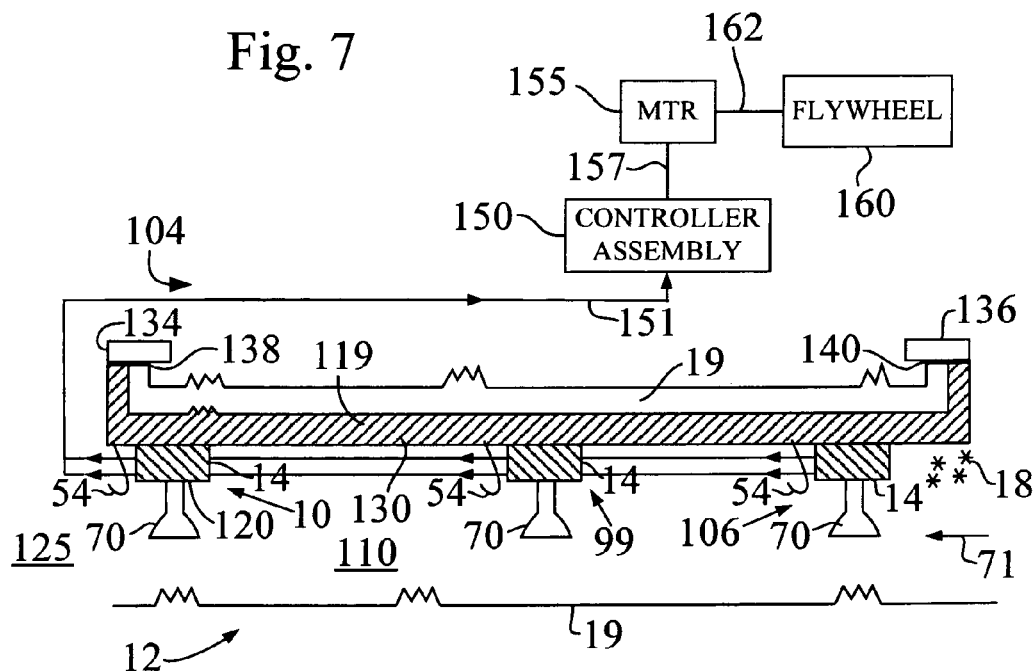
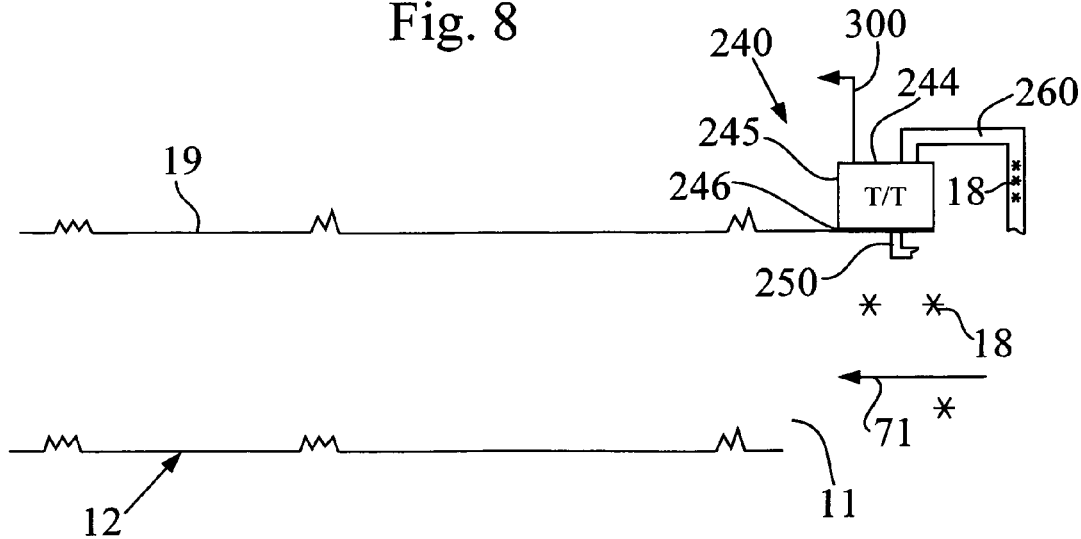

ENERGY GENERATING ASSEMBLY AND A METHOD FOR GENERATING ENERGY

GENERAL BACKGROUND

1. Field of the Invention

The present invention generally relates to an energy generating assembly and to a method for generating energy and more particularly, to a number of dissimilar generating assemblies which are each uniquely adapted to be selectively placed within close proximity to flowing material, such as by way of example and without limitation, water, oil, natural gas, or some other medium, and/or immersed in such material, and/or within or in close proximity to a pipeline or another assembly and which are further uniquely adapted to be contacted by and/or receive such dissimilar materials and such contact is effective to produce electrical energy in an efficient and very cost effective manner.

2. Background of the Invention

Great interest exists in the field of renewable or alternate energy and such interest emanates, at least in part, by the perceived and/or very real future scarcity/cost of traditional energy generating fossil type fuels, such as oil and coal. This interest also exists due to the undesirable environmental impact of the use of such fossil fuels. Moreover, this interest also exists, at least in part, due to the undesirable and relatively large and adverse environmental impact due to extracting and utilizing such traditional fossil fuel materials.

Many attempts have been made to explore alternate or renewable energy methodologies and while some methodologies do appear promising (such as the use of solar cells), others have failed. But importantly, it is realized that there exists a wholly unfilled need for new and innovative alternate and renewable energy generation methodologies and assemblies, especially those assemblies and methodologies which do not require the extraction and use of fossil type fuel material, and the present invention(s) provide such a need.

By way of example and without limitation, there exists, within the United States alone, over fifteen thousand municipal wastewater treatment plant facilities (reported in the book entitled *Wastewater Treatment Plants: Planning, Design, and Operation* (2d Edition) by Syed R. Qasim and which is fully and completely incorporated herein by reference, word for word and paragraph for paragraph). Many thousands additional such treatment facilities are located outside of the United States. Turning each and every one of these facilities into an electrical power generating station, in a cost effective and "green" or renewable manner would be a great achievement and would not only help meet the energy needs of a growing society, but would help reduce the reliance on fossil fuels and reduce the need for diesel type back up generators, currently used at many of these facilities. Diesel fuel is costly and the creation, storage, and use of such diesel fuel is undesirable. Such energy generation also may be "cleanly" stored and used when the primary electrical power source is interrupted, thereby reducing the likelihood of the facilities being "down" or inoperable and "raw" type sewage being directly transmitted into the environment.

The present series of dissimilar inventions achieves these objectives and they do more. As will be seen from the following discussion, the series of dissimilar electrical energy generating assemblies use the very same wastewater treatment process to selectively generate the desired electricity. The treatment process does not change; rather these new and novel assemblies operate in an "in line" manner with very little impact to the treatment process, while allowing for the desired generation and storage of electrical energy to occur.

SUMMARY OF THE INVENTION

It is a first non-limiting object of the present inventions, to provide a new and novel energy generation assembly which meets at least some of the unfilled needs for such assemblies, such as by way of example and without limitation, those referred to above.

It is a second non-limiting object of the present inventions to provide a new and novel renewable energy generation assembly which is adapted to generate electrical energy in a new and novel manner and to address the needs which are previously delineated above.

It is a third non-limiting object of the present inventions to provide a new and novel dual stage energy generating assembly which efficiently generates energy by the use of material which flows through a pipeline and which may either be disposed within the pipeline, either singularly or in combination with other assemblies, or which may be operatively placed at the inlet or outlet of the pipeline.

It is a fourth non-limiting object of the present inventions to provide a new and novel methodology for the production of electrical energy and to address the needs which are previously delineated above.

It is a fifth non-limiting object of the present invention to provide a plurality of dissimilar energy generating assemblies which, according to a new and novel energy generating methodology, allow for a municipal wastewater treatment facility to become an electrical energy generating facility in a cost effective and "clean" or renewable manner.

According to a first non-limiting aspect of the present invention, an energy generating assembly is provided and includes a generator having a body; at least one magnet which is disposed within the body; at least one conductor which is disposed within the body; and a selectively movable rotor which is coupled to at least one of the conductor and the magnet and wherein the rotor is adapted to communicate movement to the at least one of the conductor and the magnet and wherein the communicated movement is effective to cause relative movement between the conductor and the at least one magnet, thereby causing electricity to be produced, and wherein the body includes a mounting portion which positions the rotor within moving fluid such that the moving fluid contacts and moves the rotor, wherein such movement is communicated to the at least one of the conductor and the magnet and electricity is produced.

According to a second non-limiting aspect of the present invention, an energy generating assembly is provided and includes a body; a generator which is operatively disposed within the body; an inlet portion which extends from the body into flowing fluid and which selectively receives a portion of the flowing fluid and which communicates the received fluid to the generator, wherein the communicated fluid is effective to cause at least a portion of the generator to move and to thereby generate electricity; an outlet portion which extends from the body and which expels fluid which has been previously communicated to the generator by the inlet portion, the fluid being expelled into the flowing fluid, effective to allow at least some of the expelled fluid to again flow into said inlet portion.

According to a third non-limiting aspect of the present invention, an energy generating assembly is provided and includes a body; a generator which is operatively disposed within the body; an inlet portion which extends from the body into flowing fluid and which selectively receives a portion of the flowing fluid and which communicates the received fluid to the generator, wherein the communicated fluid is effective to cause at least a portion of the generator to move and to thereby generate electricity; an outlet portion which extends from the body and which expels fluid which has been previously communicated to the generator by the inlet portion, wherein the fluid is expelled into a portion of said flowing fluid which has not passed by said inlet.

According to a fourth non-limiting aspect of the present inventions, a dual stage electrical generator is provided and which is adapted to selectively generate electrical energy by use of material which flows through a pipeline.

According to a fifth non-limiting aspect of the present inventions, a method for producing electricity is provided and includes the steps of providing a generator; disposing the generator within a pipeline; causing material to flow within the pipeline, effective to contact the generator, thereby producing electricity.

According to a sixth non-limiting aspect of the present invention, a method for producing electricity is provided and includes the steps of identifying a municipal wastewater treatment facility which uses a certain process to clean liquids; placing an energy generation assembly within the identified wastewater treatment facility; and using the very same process which is employed by the wastewater treatment facility to generate electricity.

These and other features, aspects, and advantages of the present invention(s) are described by reference to the following detailed description of the preferred embodiment of the invention(s), including the subjoined claims, and by reference to the following drawings.

BRIEF DESCRIPTION OF THE DRAWINGS

FIG. 7 is a block diagram of a generator assembly which is made in accordance with the teachings of a second alternate and non-limiting embodiment of the inventions, and further shown as being operatively disposed within a pipeline.

FIG. 8 is a block diagram of a generator assembly which is made in accordance with the teachings of a third alternate and non-limiting embodiment of the inventions, and further being shown as being operatively disposed within a pipeline.

DETAILED DESCRIPTION OF THE PREFERRED EMBODIMENTS OF THE INVENTIONS

Figure 1:
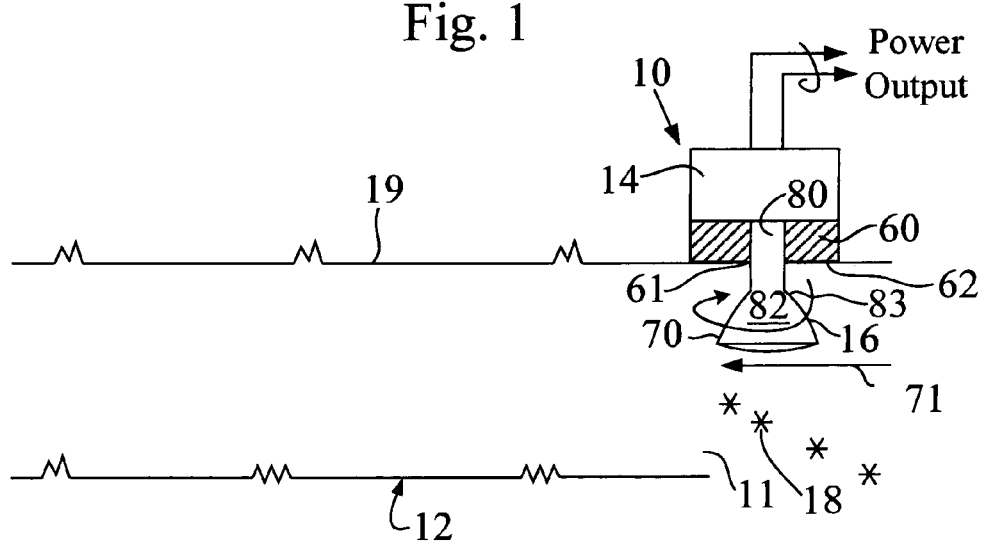
FIG. 1 is a block diagram of a generator assembly of the preferred, although non-limiting embodiment of the invention, disposed within and/or within close proximity to a pipeline.
Figure 6:
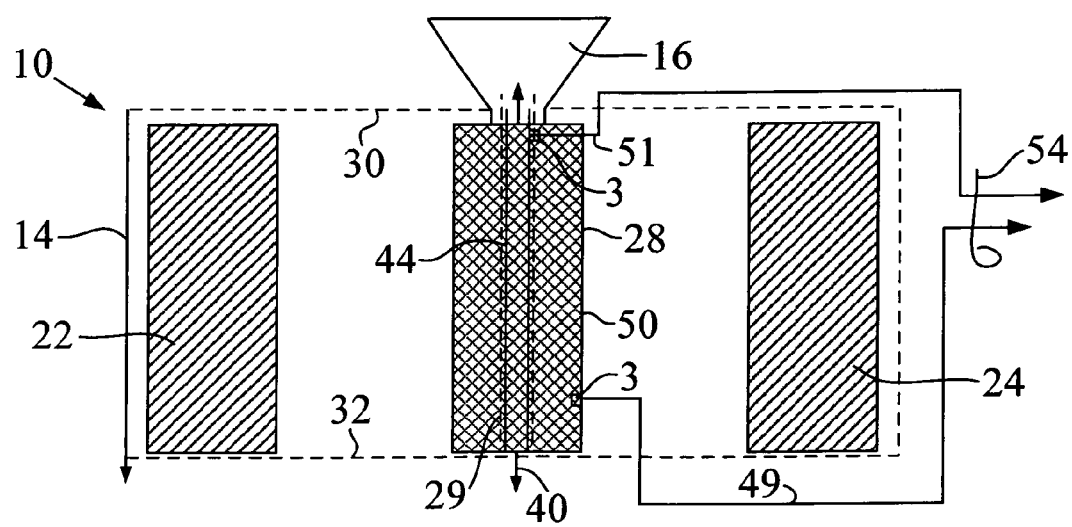
FIG. 6 is a partial exploded sectional side view of the generator assembly which is shown in FIG. 1.

Referring now to FIGS. 1 and 6, there is shown an energy generation assembly 10 which is made in accordance with the teachings of the preferred, although non-limiting embodiment of the various inventions included within this Application for Patent.

Particularly, the energy generation assembly 10, as shown in disposed in close proximity to the inlet 11 of a pipeline 12 (or other type of material conductor). It should be appreciated that the term "pipeline", as used throughout this description and throughout this Application is meant to generally refer to any type of conductor which functions to transport or aid in the transportation of material, and that nothing in this description and application is meant to limit the pipeline or material conductor to a certain type of conductor, or to a specific type of geometric configuration, and that nothing in this description and Application is meant to limit the transported material to a particular type of material. However, one important application for this new and novel technology is within a municipal wastewater treatment facility and one use for these various assemblies is actually within or in close proximity to a pipeline which carries water (e.g., in clean or unclean form). Thus, pipeline 12 may, in one non-limiting example, be considered to represent a pipeline within a municipal wastewater treatment facility and the material 18 which is shown as being transported within the pipeline 12 may be considered to be water (either in a substantially clean or unclean form). Further, as a preliminary matter, it should be appreciated that like reference numbers, used in this description, are meant to refer to like items, unless otherwise noted or implied from the descriptive context.

Thus, what is generally described in these various non-limiting embodiments are "in-line" or "in-process" energy generating assemblies which use the material transported within a pipeline to generate electricity without adversely effecting the flow rate or the existing process. For example, an existing waste water treatment process requires that water flow from various locations within a plant in order to have various processes performed upon it. These unique assemblies are adapted to cost effectively fit within the transportation pipelines and/or in close proximity to these pipelines without effecting the overall treatment process. By employing the kinetic energy of the moving water, without effecting the treatment process, electricity may be generated in a very cost effective manner and in a manner which is substantially and wholly transparent to the operators and users of the municipal wastewater treatment facilities.

While conventional turbines do exist and are used to generate electricity with water (i.e., at Niagra Falls, N.Y.), they are large, complicated, expensive and hard to maintain and operate. These conventional turbines typically require a large waterfall or large physical drop in elevation for the communicated flowing material to traverse, and they greatly and adversely impact (i.e., slow down) the flow of material which is communicated to them. Thus, these conventional turbines are not adapted to be placed into a stream of horizontally flowing material (e.g., such as that which flows in a generally and horizontally level pipeline) and are not adapted to be placed within a liquid treating process, such as a wastewater treatment process because they would slow down the process and require the overall process to change (i.e., certain steps in the process must occur within a certain time after other steps have occurred).

Moreover, even if such a pipeline were generally vertical, such conventional turbines would not fit within the pipeline and the flow rate within the pipeline, in typical wastewater treatment processes and facilities, is generally not of a sufficient rate to allow these conventional turbines to generate electricity. Additionally, such conventional turbines would most probably cause the material flowing in the pipeline to "back up" and cause very large problems in the overall process for which the flowing material is utilized. Such a "back up" is caused because these conventional turbines do not allow the communicated material to readily pass through them, especially the relatively slow moving fluid or material found within most wastewater and other pipelines. As will be appreciated, what is being described (and what will be more fully described below) are a variety of dissimilar energy generating assemblies which are readily adapted to be placed and operated within a pipeline and these "in line" or "in process" assemblies are relatively small relative to the diameter of many utilized wastewater pipelines and require even a relatively slow rate of movement to generate electricity. Novel rotor designs and dual stage designs allow for highly efficient operation without appreciably impacting the rate of flow of the material. It should further be appreciated that the term "municipal wastewater treatment plant" is meant to refer to any treatment facility of liquid, such as water, whether owned and/or operated by a municipality or not.

In this non-limiting example, the assembly 10 includes a body 14 from which a selectively movable rotor 16 emanates and into which the selectively movable rotor movably terminates. The pipeline 12 includes, in this non-limiting example, a generally cylindrical wall or boundary 19 which receives moving material 18 and such non-limiting examples of such material include, but are not limited to oil, water, natural gas, or other type of materials, since the variety of dissimilar present inventions may be used within a wastewater treatment facility and in other facilities, such as in a oil refining facility.

In this non-limiting example, as is perhaps best shown in FIG. 6, the energy generator 10 includes a first magnet 22 of a first polarity and which is disposed within the body 14 and a second magnet 24 having a second polarity and also disposed within the body 14. Both magnets 22, 24, in one non-limiting embodiment, are fixedly disposed within the body 14 (e.g., both magnets 22, 24 are attached within the body 14 by conventional fasteners or by a respective welded connection). Further, as is also best shown in FIG. 6, the generator 10 further includes an electrically conductive member 28 which is impaled by and received by axial member 29, and the axial member 29 extends from and terminates into opposed body walls 30, 32. That is, electrically conductive member 28, in one non-limiting embodiment has a generally circular cross sectional area and a longitudinal axis of symmetry 40. The electrically conductive member 28 further has a central longitudinal or axial slot or trench 44 which receives the axial member 29 and the diameter of the axial slot or trench 44 is slightly larger than the diameter of the axial member 29, such that the electrically conductive member 28 may selectively rotate about the axial member 29 within the body 14. In one non-limiting embodiment of the invention, the axis of symmetry 40 is also a longitudinal axis of symmetry of the trench or axial slot 44. In another non-limiting embodiment, the diameter of the axial member 29 is about one and one quarter to about two times larger than the diameter of the electrically conductive member 28 and this allows for some permissible "wobbling". That is, the member 28 does not only rotate around the axial member 29 but may move from side to side, or within an arc, as well, increasing the overall motion of the member 28 and such increased motion increases the amount of electricity which may be generated from the assembly 10, in a manner which is discussed below.

Further, as is shown in each of FIGS. 1 and 6, the energy generating assembly 10 includes a rotor 16 and the rotor 16 movably protrudes from the wall 30 (e.g., extends through a slot formed in the wall 30) and is either coupled to or integrally terminates upon the electrically conductive member 28 (e.g. in another non-limiting embodiment, the member 29 extends through the slot 44 and traverses into the rotor 16 (including through the wall 30 and into the large portion 70 of the rotor). In this manner, should the rotor 16 be forcibly moved, such rotor movement is transferred to the electrically conductive member 28 and such transferred movement is effective to cause the electrically conductive member 28 to rotate about and/or otherwise move about the axial member 29. In the most preferred embodiment of the invention, the electrically conductive member 28 is movably positioned, within the body 14, between the first and second magnetically charged members 22, 24. As shown, the rotor 16 extends or is movably disposed within a slot formed in the wall 30 and is coupled to the electrically conductive member 28.

As the electrically conductive member 28 rotates, within the body 14, electrical energy is generated due to the presence of the magnetic field existing by and between the magnets 22, 24 of opposed polarity and traversing the electrically conductive member 28. The generated electrical energy may be harvested by use of a first bus 49 which is coupled to an edge 50 of the moving electrically conductive member 28 and by a second bus 51 which is coupled to the electrically conductive member 28 at a point in close proximity to the trench or axial slot 44. The coupling of the busses 49, 51 to the conductive member 28 may be achieved by the use of respective slip rings 3. As should now be appreciated, the busses 49, 51 cooperatively define an output bus 54 which may transport the generated electrical energy in a desired manner and to a desired location. Relative movement of one of the member 28 and the members 22, 24 produce electricity.

A references exists which describe a homo polar generator, namely the published international patent publication number PCT WO 95/08210 which is entitled "A HOMOPOLAR GENERATOR", which was published on Mar. 23, 1995, and which is fully and completely incorporated herein by reference, word for word and paragraph for paragraph. However, this reference does not teach or disclose the previously described assembly 10 (e.g., the reference teaches an assembly having a portion which is physically moved by a motor 62 and a belt 63), the reference does not disclose an assembly which is adapted to be utilized in an "in line manner", such as within a wastewater treatment application, the reference does not teach the various configurations which form a part of these inventions, such as, by way of example and without limitation, the novel rotor designs and the dual stage designs, and the reference does not teach or disclose the various other aspects and embodiments of the present inventions (e.g., wobbling).

In this non-limiting embodiment of the invention, the body 14 is attached to the boundary or wall 19 of the pipeline 12 by a mounting member 60. That is, in this one non-limiting embodiment of the invention, the mounting member 60 is made from steel material, may have a generally cylindrical cross sectional area with a central orifice or "through hole"

61, and is coupled to the wall 19 by the use of a welded connection 62. The mounting member 60 is mounted to or positioned in close proximity to the inlet 11 of the pipeline 12. The body 14 is welded to the mounting member 60 such that the rotor 16 passes through and partially resides within the "through hole" 61 of the mounting member 60. In this manner, the large end of the rotor 70 is generally disposed perpendicular to or transverse to the direction 71 of flow of the material 18 being communicated into the pipeline 12, through the inlet 11. The flowing material 18 impinges upon the large portion 70 of the rotor 16 and causes the entire body of the rotor 16 to selectively move and/or rotate within the "through hole" 61. Such rotor rotation causes rotation of the electrically conductive member 28 to occur, within the body 14, and such rotation causes electrical energy to be generated on the bus 54, in the manner previously described. Thus, it should be appreciated that the kinetic energy associated with the flow of material 18 in the pipeline 12 is harvested in a "clean" or "green" manner to generate electrical energy and in a manner which is substantially transparent to the overall wastewater treatment process (or other process).

Figure 2:
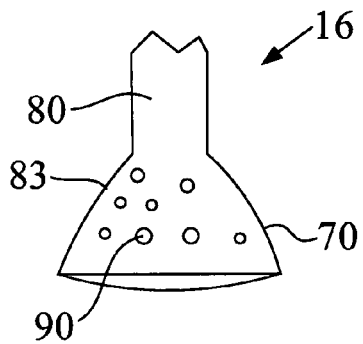
FIG. 2 is an exploded side perspective view of the rotor portion of the generator assembly which is shown in FIG. 1.
Figure 3:
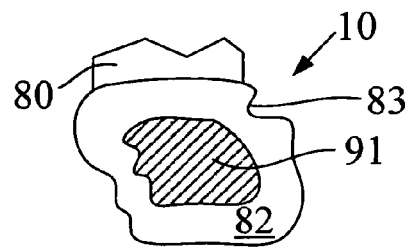
FIG. 3 is an exploded side perspective view of an alternate embodiment of the rotor portion of the generator assembly which is shown in FIG. 1.
Figure 4:
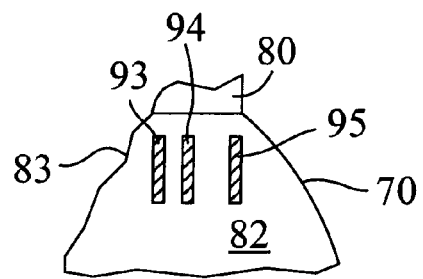
FIG. 4 is an exploded side perspective view of another alternate embodiment of the rotor portion of the generator assembly which is shown in FIG. 1.

As shown best in FIGS. 2, 3, and 4, many different shapes, sizes, and geometric configurations of rotors 16 may be utilized. One may desire to maximize the rotational energy of the large portion 70 of the rotor while minimizing drag in order to increase the overall efficiency of the energy generating process (e.g., converting as much of the received kinetic flow energy into electricity) while minimizing the overall flow rate impact that the rotor 16 has on the flow rate which occurs as the material 18 flows into the pipeline 12 (e.g., the term "drag" means the reduction of such material flow rate experienced by the use of and placement of the rotor 16 within or in close proximity to the pipeline 12). The relatively solid mounting member 60 absorbs shock or vibration before such shock or vibration is communicated to the body 14, thereby decreasing the potential for shock or vibration induced damage. In another non-limiting embodiment, the mounting member 60 may be obviated and the body 14 may be directly attached to the wall or pipeline boundary 19 by a welded connection or some other connection or fastener.

By way of example and without limitation, the rotor 16, shown, for example in FIGS. 1 and 6, may be constructed to have a narrow body or neck portion 80 which terminates into and traverses the "through hole" 61 before receiving the axial member 29. The neck 80 may rotate or arcuately move within the "through hole" 61. The large or "expanded" portion 70 is the portion that mostly contacts the flowing material 18 and in this example has a rounded and triangular cross sectional area.

As best shown in FIG. 2, in order to reduce undesired drag, the enlarged portion 70 may have a plurality of "through holes" into which the flowing material 18 may traverse. Such plurality of "through holes" reduces the decrease in overall material flow rate caused by the placement of the rotor 16 in the pipeline, while at the same time allowing for the flowing material 18 to impact and rotate the rotor 16. The openings 90 may or may not be similar in size and shape.

In yet another non-limiting rotor embodiment, as is perhaps best shown in FIG. 3, one or more side surfaces, such as side surfaces 82, 83 include a depressed portion or pocket 91. Such pockets 91 cause the flowing material 18, which impinges upon such pockets 91, to briefly adhere to the pockets, such as pocket 91, to increase the amount of rotation imparted to the portion 70.

In yet another non-limiting rotor embodiment, as is perhaps best shown in FIG. 4, one or more of such side surfaces, such as side surfaces 82, 83 include one or more pocketed or depressed strips, such as pocketed strips 93, 94, 95 which are positioned about the surfaces, such as side surfaces 82, 83 and which may be similar or dissimilar in size and shape. The strips, such as strips 93, 94, 95 also receive flowing material 18 and cause the received material 18 to adhere to the strips 93, 94, 95 and to increase the rotation of the rotor 16. The faster that the rotor 16 rotates, the more electricity is produced on the bus 54.

Figure 5:
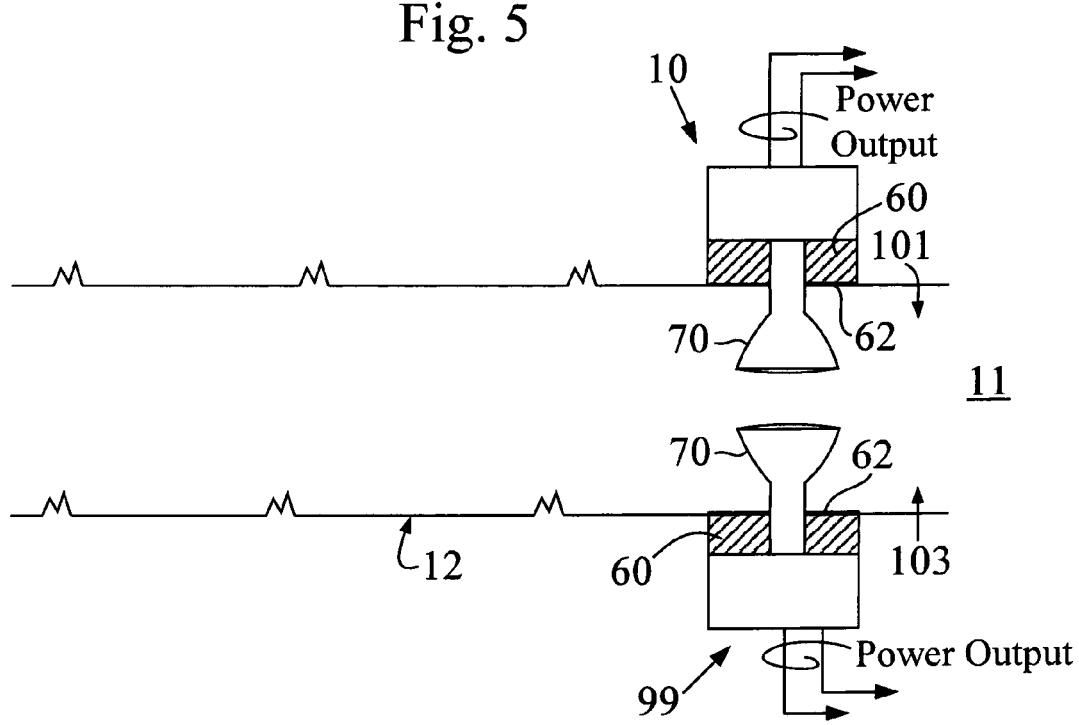
FIG. 5 is a block diagram of a generator assembly which is made in accordance with the teachings of an alternate and non-limiting embodiment of the inventions and shown as disposed within and/or positioned in close proximity to a pipeline.

In yet another non-limiting embodiment of the invention, as is perhaps best shown in FIGS. 1 and 5, multiple assemblies 10 and 99 may be deployed on opposed sides 101, 103 of the pipeline inlet 11. It should be appreciated that assembly 99 is substantially similar to the previously described assembly 10. In this manner more electrical energy may be produced than associated with that which has been shown and described with respect to FIG. 1.

In yet another non-limiting embodiment of the invention, an energy generation configuration 104 may be created as is best shown in FIG. 7. That is, in this configuration 104 multiple assemblies 10, 99, and 106 may actually be deployed within the formed or defined internal cavity 110 of the pipeline 12. It should be appreciated that each of assemblies 99 and 106 are substantially similar to the previously described generating assembly 10.

Particularly, in this non-limiting embodiment of the invention, each respective body 14 of each assembly is attached to a rail 119 (such as by the use of respective welded connections, such as welded connection 120). The rail 119 may be composed of commercially available steel material and traverses the pipeline 12, from the inlet portion 11 to the outlet portion 125, while positioning the assemblies 10, 99, 106 along the upper interior wall 130 of the pipeline 12 and the rail member (which may be a relatively thin and rectangular shape) has substantially similar and curved and opposed ends 134, 136 which respectively emanate from the pipeline ends 125, 18 and which are connected to the pipeline exterior wall or boundary 19 by respective welded connections 138, 140. It should be appreciated that substantially any desired number of energy generating assemblies, such as energy generating assemblies 10, 99, and 106, may be operatively deployed upon rail 119 and within the cavity 110 and that each such deployed assembly, such as assemblies 10, 99, and 106 may generated energy by the respective impingement of the flowing material 10 upon the respective rotors 70. It should further be appreciated that each respective rotor 70 may even have a different geometric configuration.

In another non-limiting embodiment of the invention, the energy generating configuration 104 includes a controller assembly 150 which is operable under stored program control and which receives the energy which is being generated from each of the energy generating assemblies, such as assemblies 10, 99, and 106. Such energy is communicated to the controller assembly 150 by the use of bus 151 which is coupled to each of the respective busses 54 which emanate from and which terminated into each of the deployed energy generating assemblies, such as assemblies 10, 99, and 106. Further, in this non-limiting energy generating configuration 104, there is included a motor 155, which is coupled to the controller assembly 150, by the use of bus 157, and a flywheel or other type of energy storage assembly 160, which is coupled to the motor 155 by use of the bus 162.

In this manner, the controller assembly 150 receives, by the use of bus 151, the generated electrical energy which is being generated by the various assemblies, disposed within the pipeline 12, and then selectively communicated some or all of the received energy to the motor 155 which allows the communicated energy to be stored by selective movement of the flywheel 160. To selectively harvest the stored energy from the flywheel 160, the controller assembly 150, by use of commands which are generated by the controller assembly 150 and placed on the bus 157, causes the motor assembly 155 to receive energy from the rotating flywheel 160 and to source the received energy to substantially any desired item which may be coupled to the motor 155.

Figure 10:
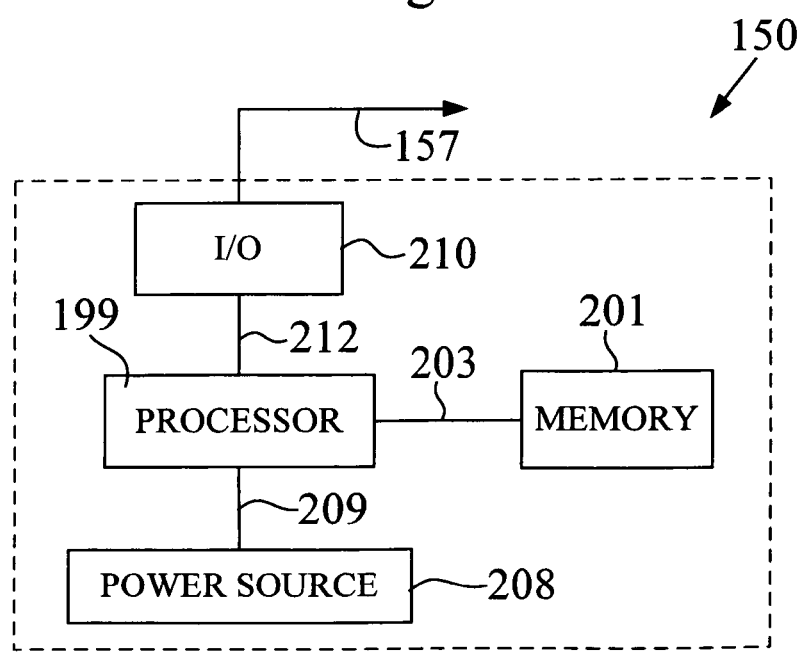
FIG. 10 is a block diagram of the controller assembly which is made in accordance with a non-limiting embodiment of the invention and which is shown in FIG. 7.

To further understand the operation of the controller assembly 150, reference is now made to FIG. 10. As shown, in one non-limiting embodiment of the invention, the controller assembly 150 includes a processor 199, such as by way of example and without limitation a commercially available processor such as what is referred to as a "dual core"® type of processor which is available from the Intel® Corporation of Oregon. The controller assembly 150 further includes a memory portion 201 which contains the software or code necessary to define the operation of the controller assembly 150 and which is coupled to the processor 199 by the use of the bus 203. The memory portion 201 also may receive items placed into it by the processor 199 or my other assemblies, items, and individuals in communication with the controller assembly 150. In one non-limiting embodiment, all of the items/data/commands which reside within the memory portion 201 are accessible and modifiable or dilatable by the processor 199. Further, the controller assembly 150 also includes a source of electrical power, such as power source 208, which is coupled to the processor 199 by the bus 209 and which provides operating power to the processor 199 and perhaps to the memory 201, through the processor 199 and the busses 209, 203. In one non-limiting embodiment of the invention, the power source 208 is comprised of a lithium ion battery, although other types of power sources may be used, including but not limited to a direction connection to a commercially available power source. The controller assembly 150 further includes an input/output portion 210 which is coupled to the processor 199 by the use of bus 212 and which communicates to global networks, to other items, such as motor 155, and to individuals by use of bus 157. That is, processor 199 receives and communicates commands, data, and other information to various items, individuals, and assemblies by use of the input/output portion 210, which may include a radio frequency modulator and demodulator and which allows the processor 199 to communicate wirelessly.

Referring now to FIG. 8, there is shown yet another non-limiting energy generation configuration 240 which is made in accordance with the teachings of another alternate embodiment of the inventions.

In this non-limited energy generation configuration 240, an energy generation assembly 244 is disposed at the inlet 11 of the pipeline 12. Particularly, the energy generation assembly 244 has a body 245 which is coupled to the wall or boundary 19 by the use of a welded type connection 246, or some other type of connection. In this non-limiting energy generation configuration 240, the assembly 244 comprises a Tesla Turbine and has an L-shaped or elbow shaped hollow inlet 250 which is disposed in the direction 71 of the flow of material 18. In this manner, some of the flowing material 18 enters the inlet 250 and is communicated within the body 245 where the flowing material causes the Tesla Turbine 244 to generate electricity. The energy generating assembly 244 further includes a generally hollow outlet portion 260 which exhausts previously received material 18 after the previously received material 18 causes energy generating movement within the Tesla turbine 244. Importantly, in this non-limiting energy generating configuration 104, the outlet 260 exhausts the previously received material 18 directly into the material stream 18 at a point of before it reaches the assembly 244. In this manner, very little of the material 18 is lost or wasted and an exhaust reservoir is not needed. The generated electricity, emanating from the assembly 244, is harvested by the use of bus 300.

Figure 9:
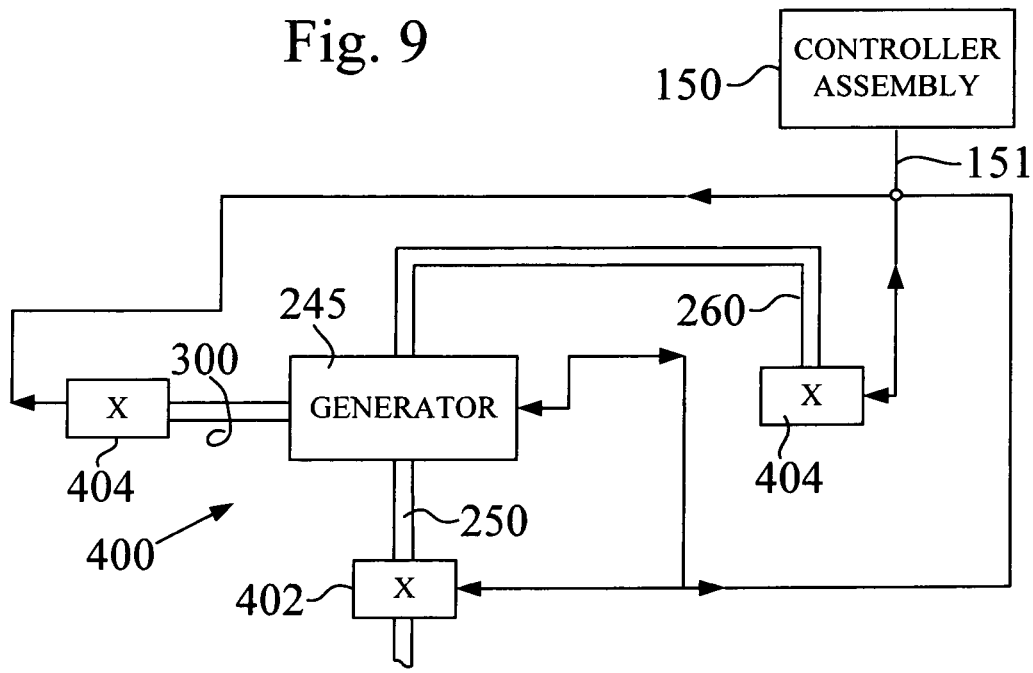
FIG. 9 is a block diagram of a generator assembly which is made in accordance with the teachings of a fourth alternate and non-limiting embodiment of the inventions, and further being shown as being operatively disposed within a pipeline.

Referring now to FIG. 9, there is shown an energy generation configuration 400 which is made in accordance with the teachings of yet another alternate embodiment of the various inventions.

Configuration 400 is substantially similar to configuration 240 with the exception there are remotely and selectively activatable valves 402, 404 which are respectively and operatively disposed within inlet 250 and outlet 260 and which are coupled to bus 151. Further, a normally closed switch 404 is coupled to bus 300. In this manner, processor 199 may selectively open valve 402 and prevent material 18 from entering the generator 245 and/or may prevent previously communicated material 18 from exiting outlet 260. By selectively opening both valves 402, 404, the processor 199 may selectively remove the generator 245 from the flow of material 18 and such remote removal may be desirable if it is determined that generator 245 is malfunctioning and/or during a "clean out" of the pipeline 12. Further, the processor 199 may selectively open switch 404 and when switch 404 is selectively opened no electrical energy may be transferred from the generator 245 to the controller assembly 150. Of course, valves 402, 404 are controlled (i.e., selectively opened and closed by commands which are sent to these valves 402, 404 by the processor 199 by use of bus 151). Similarly, the switch 404 is controlled by commands which are generated by the processor 199 and communicated to the switch 404 by the processor 100 and the bus 151.

Figure 11:
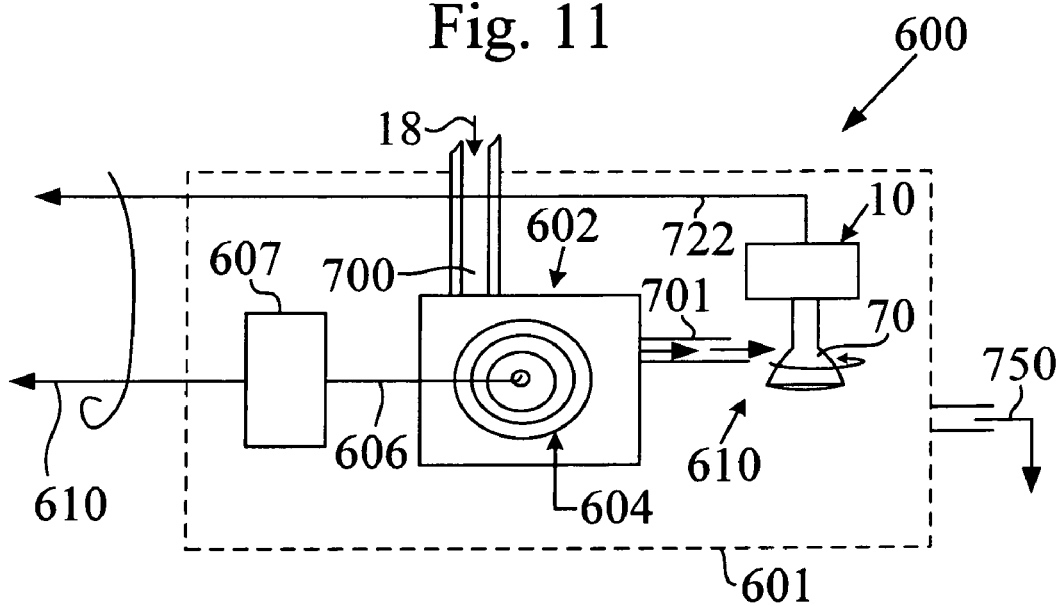
FIG. 11 is a block diagram of a dual stage generator which is made in accordance with the teachings of the various inventions.

Referring now to FIG. 11, there is shown a dual stage electrical energy generating assembly 600 which is made in accordance with the teachings of yet another alternate embodiment of the invention.

Particularly, the dual stage assembly 600 includes a body 601 having a first stage or portion 602 which is substantially similar to the previously described assembly 245 and which may comprise a Tesla turbine portion. The first portion or stage 602 includes a plurality of interconnected plates 604 which are coupled to a rotor or axial member 606. The rotor 606 is coupled to a motor/generator 607 and the output of the motor/generator 607 is coupled to bus 610. The second portion or stage 610 is substantially similar to the previously described assembly 10. That is, assembly 245 has such plates 604, member 606, and motor/generator 607 which are connected as shown in FIG. 11.

The inlet portion 700 is disposed within the pipeline 12 and receives material 18. The received material 18 causes the plurality of plates 604 to rotate, before being exhausted from outlet 701. The forced rotation of the plates 604 causes the rotor 606 to rotate which causes the motor/generator 607 to generate electrical energy on the bus 610. Thus, the first stage 602 of the dual stage assembly 600 generates electricity independently of the second stage 610.

The exhausted material, emanating from the outlet 701, is made to impinge the rotor 70 of assembly 10 and such rotation causes electricity to be generated on output bus 722, in a manner which has been previously described. The second stage thus augments the electrical energy which has been generated by the first stage 602. The material 18 which impinges and rotates the rotor 70, exits the body 601 through outlet 750 and this exiting material 18 is placed at a point in the flow which occurs before the assembly 600 (e.g., the exiting or exhausted material is made to again flow toward the assembly 600). In this manner, none of the exhausted material is wasted and the need for a material reservoir is obviated.

Figure 12:
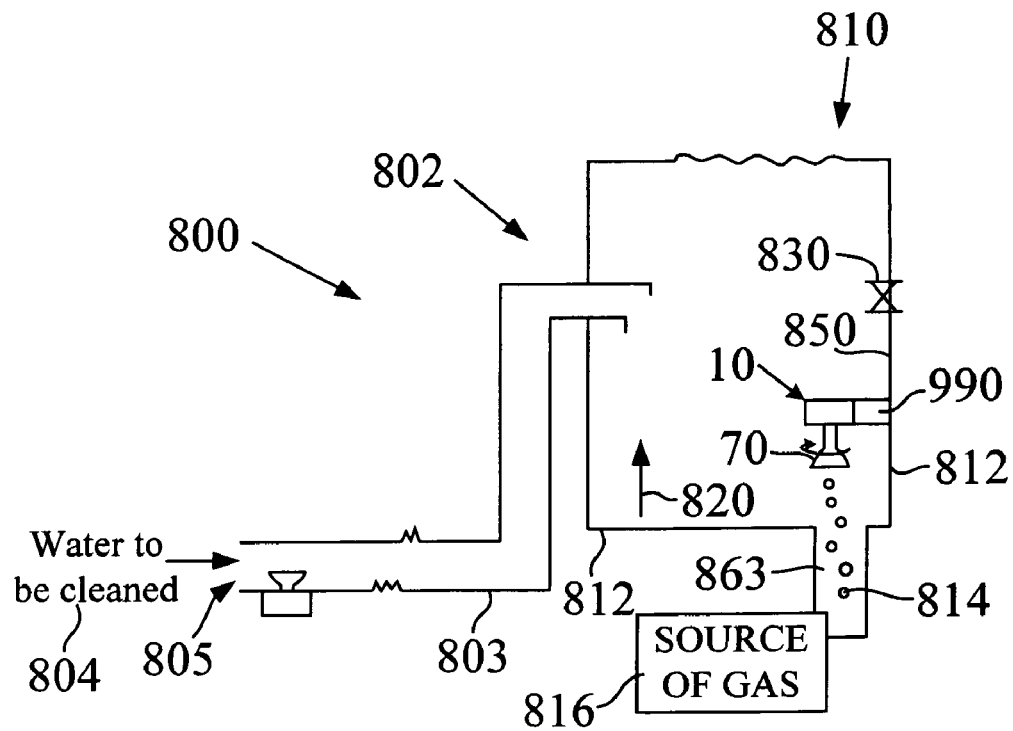
FIG. 12 is a partial block diagram of a municipal wastewater treatment plant having energy generation assemblies which are made in accordance with the teachings of the various non-limiting embodiments of the inventions.

Referring now to FIG. 12, there is shown a block diagram 800 which is meant to generally represent a typical municipal wastewater treatment facility 802.

In this one non-limiting example, the facility 802 includes at least one pipeline 803 (which may be substantially similar to pipeline 12) which is adapted to selectively receive wastewater 804 (which may correspond to the material 18), through an inlet portion 805. The received material 804 is carried, by the pipeline 803, to an aeration pond 810 which comprises a holding tank 812 into which gaseous material 814 is injected by a gaseous source 816. Particularly, as the material 804 enters and resides within the tank 812, the emitted gas 814 flows through the contained material 804 in a direction 820. The flowing gaseous material 814 cleans the contained material 804 and once the contained material is cleaned, the cleaned material 814 is exhausted through the tank 812 by the use of an exit valve 830. Of course, the wastewater material 804 may be subjected to a variety of other processes before such material 804 enters and is communicated to the tank 812, and/or after such material 804 selectively leaves the tank 812.

In this non-limiting embodiment of the invention, an assembly 10 is deployed upon and/or through the side wall 850 of the tank 812, proximate to the inlet 863 which communicates gaseous material 814 into the tank 812. The selectively injected gaseous material 814 impinges the rotor 70, causing the rotor 70 to be moved and/or rotated and this rotation or movement causes the assembly 10 to generate electricity in the manner which has been previously described. It should be appreciated that assembly 10 may be located at other locations of the tank 812 and that multiple assemblies 10 may be utilized within the tank 812. It should further be appreciated that the use of assembly 10, within the tank 812, does not appreciably change or adversely impact the cleaning process, since the injected gaseous material 814 still moves in the direction 820 and still cleans the contained material 804. Further, alternative to assembly 10 or in addition to assembly 10, other assemblies such as 240 and 600 may be selectively and operatively utilized within the tank 812. Body 14 may be selectively welded to the tank sidewall 812, or at other locations, by an arm 990 which may be welded to the sidewall 812.

It is understood that the various non-limiting inventions are not constrained or limited by the exact construction or methodology which has been previously described, but that various changes and modifications may be made without departing from the spirit and the scope of the inventions as may be delineated in the following claims. Moreover, it should be appreciated that the various dissimilar energy generation assemblies, such as by way of example and without limitation, assemblies 10, 99, 106, 240, and 600 allow for in-line process electrical energy generation and that these assemblies are very cost effective, relatively uncomplicated, and will not adversely and substantially effect the process into which they are selectively and operatively inserted. It should further be appreciated that pipeline 12 may alternatively represent an automobile exhaust pipe and that the various energy generation assemblies, such as assembly 10, may deployed within an automotive exhaust system and rotor 70, for example, may be selectively impinged by the automotive exhaust gas before such gas is exhausted from the automobile. In this manner, some of the kinetic energy of the exhaust gas is transformed or harvested as electrical energy which may be utilized and/or stored within the automobile.

What is claimed is:

1. A method for producing electricity within a wastewater treatment facility of the type, which receives liquid, and which cleans the liquid by use of a certain process;
    said method comprising the steps of identifying said certain process;
    placing a dual stage energy generation assembly within said identified process;
    and using said process and said dual stage energy generation assembly to generate electricity, wherein said dual stage energy generation assembly has two stages and each or said stages generates electricity;
    wherein said first and second stages are dissimilar and,
    wherein said process includes the use of an aeration pool, where said dual stage assembly is in communication with said aeration pool.

2. A method for producing electricity within a wastewater treatment facility of the type, which cleans liquids by the use of a process, which utilizes an aeration pool;
    said method including the steps of using said process to produce electricity by placing an energy generation assembly within said aeration pool and wherein said energy generation assembly includes a first stage which generates electricity and a second stage which generates electricity and;
    wherein liquid within said wastewater treatment facility is first communicated to said first stage effective to cause said first stage to generate electricity and then said liquid is communicated to said second stage which causes said second stage to generate electricity and wherein said first and said second stages are dissimilar.

3. A method for producing electricity comprising the steps of identifying a municipal wastewater treatment facility which uses a certain process; including an aeration pool, to clean liquids; placing an energy generation assembly within the wastewater treatment facility wherein said energy generation assembly includes a plurality of energy generators which are in mutual communication;
    and using the same process which is employed by the wastewater treatment facility to generate electricity by having some of the liquid of the process impinge upon at least a first of said plurality of energy generation assemblies and wherein said plurality of energy generation assemblies are each in communication with said aeration pool.

4. The method of claim 3 where said first stage comprises a tesla turbine.

* * * * *